(12) United States Patent
Valentini et al.

(10) Patent No.: US 8,313,186 B2
(45) Date of Patent: Nov. 20, 2012

(54) MAGENTA INKJET INK AND AN INKJET INK SET CONTAINING SAME

(75) Inventors: Jose Esteban Valentini, West Chester, PA (US); Christian Jackson, Wilmington, DE (US); Kuo Hsiung Kung, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 218 days.

(21) Appl. No.: 12/747,632

(22) PCT Filed: Dec. 10, 2008

(86) PCT No.: PCT/US2008/086260
§ 371 (c)(1),
(2), (4) Date: Jun. 11, 2010

(87) PCT Pub. No.: WO2009/076457
PCT Pub. Date: Jun. 18, 2009

(65) Prior Publication Data
US 2010/0283814 A1   Nov. 11, 2010

Related U.S. Application Data

(60) Provisional application No. 61/007,471, filed on Dec. 13, 2007.

(51) Int. Cl.
*C09D 11/00* (2006.01)
(52) U.S. Cl. ........................................ 347/100
(58) Field of Classification Search .................. 347/100
See application file for complete search history.

(56) References Cited

U.S. PATENT DOCUMENTS

| 6,379,441 | B1 * | 4/2002 | Kanaya et al. ............. 106/31.49 |
| 6,511,171 | B2 * | 1/2003 | Yoshizawa et al. ........... 347/100 |
| 2007/0058015 | A1 * | 3/2007 | Wheeler et al. ............... 347/100 |
| 2009/0092755 | A1 * | 4/2009 | Valentini et al. .............. 427/288 |

OTHER PUBLICATIONS

SpecialChem, Ciba Specialty Chemicals Introduces New Effects and Expanded Services at the European Coatings Show, Apr. 21, 2005, http://www.specialchem4coatings.com/news-trends/displaynews.aspx?id=2984.*

* cited by examiner

*Primary Examiner* — Laura Martin
(74) *Attorney, Agent, or Firm* — John H. Lamming; Simon L. Xu

(57) ABSTRACT

The present invention pertains to a magenta inkjet ink and to an inkjet ink set for inkjet printing comprising the magenta ink and further comprising a yellow and cyan inkjet ink. The magenta ink and the other inks in the ink set are characterized by the presence of certain specific colorants. The magenta ink comprises a certain magenta dye defined in the specification and either one or both of Acid Red 52 and Acid Red 249. The yellow ink comprises Acid Yellow 79 and one or any combination of Direct Yellow 169, Direct Yellow 86 and Acid Orange 33. The cyan ink comprises Direct Blue 199. The magenta ink and the ink set are particularly advantageous for printing on plain and photo-glossy paper.

12 Claims, No Drawings

MAGENTA INKJET INK AND AN INKJET INK SET CONTAINING SAME

CROSS-REFERENCE TO RELATED APPLICATION

This application claims priority from U.S. Provisional Application Ser. No. 60/007,471 (filed Dec. 13, 2007), the disclosure of which is incorporated by reference herein for all purposes as if fully set forth.

BACKGROUND OF THE INVENTION

The present invention pertains to a magenta ink for inkjet printing and, in particular, to a magenta ink comprising a certain combination of magenta colorants. The present invention further pertains to an ink set comprising this magenta ink and a certain cyan and yellow ink. The ink and ink set provide advantageous color and light-fastness.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

Inkjet printers are equipped with an ink set which, for full color printing, typically comprises a cyan, magenta and yellow ink (CMY). An ink set will also commonly comprise a black ink (CMYK). Colorants for the inks can be soluble in the ink vehicle (dyes) or insoluble (pigments).

The ink set should provide printed images having good color characteristics, such as correct hue and high chroma. Preferably, the ink set will achieve these favorable characteristics on a range of media including plain paper as well as specialty media such as transparency film and coated paper. Also, preferably, the hard copy output is reasonably light-fast.

A suitable ink should generally exhibit good crusting resistance, good stability, proper viscosity, proper surface tension, good color-to-color bleed alleviation, rapid dry time, consumer-safety and low strike-through.

Various magenta, yellow and cyan dyes, and CYM dye sets, have been disclosed for plain paper and photo paper printing. Most of the attention though is directed to selection of the magenta colorant as it tends to be the colorant most vulnerable to light fade. It is desirable for a dye to have the best possible light-fastness.

Reactive Red 180 is probably the most commonly mentioned magenta dye for use in inkjet inks. It can be used alone or in combination with Acid Red 52 to achieve a more violet shade. However, U.S. Pat. No. 6,641,257, provides light-fastness evaluation of a number of magenta dyes and Acid Red 37, Acid Red 289, Direct Red 75, Direct Red 212, Reactive Red 141, Reactive Red 23 and Reactive Red 195 are all more light-fast than Reactive Red 180.

A magenta ink with excellent light-fastness comprising a mixture of Magenta 377 and Acid 52 is disclosed in U.S. Pat. No. 5,772,742. Ink comprising hydrolyzed Reactive Red 23 magenta colorant is disclosed in U.S. Pat. No. 6,458,195 as having high lightfastness. Magenta inks comprising certain copper complex azo dyes are disclosed in U.S. Pat. No. 6,521,032 as having good color and light-fastness.

Other known dyes for magenta inkjet inks include Direct Red 227 as disclosed, for example, in U.S. Pat. No. 5,143,547 as part of a CYM ink set. A mixture of magenta anthrapyridone dye and Reactive Red 23, Reactive Red 24, Reactive Red 31, Reactive Red 120, Reactive Red 180, Reactive Red 241, Acid Red 35, Acid Red 52, Acid Red 249, Acid Red 289, Acid Red 388, Direct Red 227 or CAS No. 153204-88-7 is disclosed in U.S. Pat. No. 6,706,102. A mixture of Acid Red 92 and Reactive Red 180, Direct Red 75, or Reactive Red 159 is disclosed in U.S. Pat. No. 6,793,722.

Dye-based cyan ink with good light-fastness is disclosed in U.S. Pat. No. 6,379,441. Dye-based yellow inkjet inks comprising Acid Yellow 79 and either one or both of Direct Yellow 169 and Acid Orange 33 are disclosed in co-owned and co-pending application U.S. App. Ser. No. 60/993,373 (filed Sep. 12, 2007).

Sets of dye-based inkjet inks having good color and light-fastness are disclosed in U.S. Pat. Nos. 5,749,951; 5,851,273; 5,858,075; 6,183,548, and 6,712,462.

Still, a need exists for improved inks and ink sets that provide vivid color and fade resistance, especially on specialty paper such as photo-glossy paper.

SUMMARY OF THE INVENTION

In accordance with an objective of the present invention there is provided a magenta inkjet ink comprising a first dye, Irgasperse® Jet Magenta 3BL, and a second dye selected from the group consisting of Acid Red 52 (AR52), Acid Red 249 (AR249) and mixtures thereof.

In accordance with another objective of the present invention there is provided an ink set comprising a magenta, yellow and cyan inkjet ink which ink set comprises a magenta ink as set forth above, a yellow ink comprising Acid Yellow 79 (AY79) dye and a second dye selected from the group consisting of Direct Yellow 169, Direct Yellow 86 (DY86), and Acid Orange 33, and a cyan ink comprising Direct Blue 199.

Colorants are referred to by their "C.I." designation established by Society Dyers and Colourists, Bradford, Yorkshire, UK and published in *The Color Index*, Third Edition, 1971, unless otherwise indicated.

Preferably, all inks are aqueous inks comprising aqueous vehicle. The aqueous vehicle of each ink is selected independently and may be the same as or different from the aqueous vehicle of any other ink in the set.

In yet another aspect the present invention pertains to a method for ink jet printing onto a substrate, comprising the steps of:
  (a) providing an ink jet printer that is responsive to digital data signals;
  (b) loading the printer with a substrate to be printed;
  (c) loading the printer with an inkjet ink set as set forth above and as described in further detail below; and
  (d) printing onto the substrate using the inkjet ink set in response to the digital data signals.

Preferred substrates include plain paper and photo glossy paper.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

Colorants

The colorant in the magenta ink of the present invention comprises a first magenta dye and a second magenta dye. The first magenta dye is Irgasperse® Jet Magenta 3BL from Ciba Specialty Chemicals, Basel, CH. Although the structure of the dye is not disclosed by the manufacturer, analysis indicates Irgasperse® Jet Magenta 3BL dye is a copper-azo complex, the acid form of which can be represented by Formula 1 below.

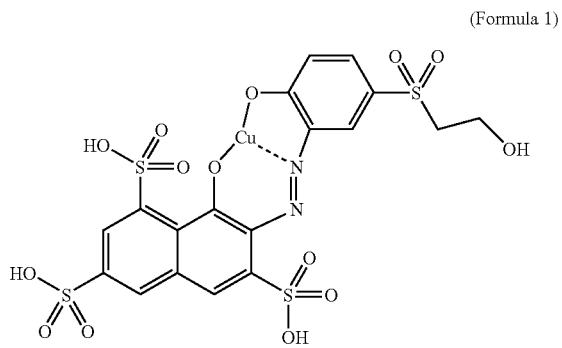

(Formula 1)

The second magenta dye is either one or both of Acid Red 52 (AR52) and Acid red 249 (AR249). At typical inkjet ink pH, e.g. 6.0 to 8.0, some or all the acid groups on the dye of Formula 1, as well as other dyes, will be in the salt form. Counter-ions for the dye salts include, for example, alkalai metals, ammonium and substituted ammonium, but are not limited thereto.

A suitable weight ratio of the dye of formula 1 to Acid Red 52 is typically in the range of between about 50:1 and about 2:1 and preferably in a range of between about 9:1 and 4:1. A suitable weight ratio of the dye of formula 1 to Acid Red 249 is typically in the range of between about 10:1 and about 1:1 and preferably in a range of between about 5:1 and 2:1.

Magenta copper complex azo dyes similar to Formula 1 are described in U.S. Pat. No. 6,521,032, the disclosure of which is incorporated by reference herein for all purposes as if fully set forth.

The colorant for the yellow inks in the ink sets of the present invention is comprised of Acid Yellow 79 (AY79) dye and a second dye selected from the group consisting of Direct Yellow 169, Direct Yellow 86 (DY86), and Acid Orange 33. The colorant for the cyan ink in the ink sets of the present invention comprises Direct Blue 199 (DB199). Sources of colorants are generally well known to those skilled in the art.

A desirable yellow hue can be achieved, for example, by an AY79 to DY86 weight ratio in the range of between about 9:1 to about 1:9, and more preferably between about 1:5 and 5:1. The weight ratio of an AY79/A033 colorant combination is typically in the range of about 50:1 to about 2:1 and more preferably between about 30:1 and about 5:1. The weight ratio of an AY79/DY169 colorant combination is typically in the range of about 9:1 to about 1:9, and more preferably between about 1:5 and 5:1.

The dye content in a full strength ink is typically between about 1% and 10% by weight of the total weight of ink. More typically, the dye content is between about 2% and 8% by weight of the total weight of ink. So-called "light" inks generally will contain somewhat less dye, generally in the range of about 0.1 to 2% by weight of the total weight of ink.

Vehicle

The ink vehicle is the carrier (or medium) for the colorant. An "aqueous vehicle" refers to a vehicle comprised of water or a mixture of water and at least one water-soluble organic solvent (co-solvent) or humectant. Selection of a suitable mixture depends on requirements of the specific application, such as desired surface tension and viscosity, the selected colorant, and compatibility with substrate onto which the ink will be printed.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone, 1,3-bis(2-hydroxyethyl)-5,5-dimethylhydantoin and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

An aqueous vehicle will typically contain about 30% to about 95% water with the balance (i.e., about 70% to about 5%) being the water-soluble solvent. Ink compositions typically contain about 60% to about 95% water, based on the total weight of the aqueous vehicle.

Additives

Other ingredients (additives) may be formulated into the inkjet ink, to the extent that such other ingredients do not interfere with the stability and jetablity of the finished ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Tomadol® series from Tomah Products) and secondary (e.g. Tergitol® series from Union Carbide) alcohols, sulfosuccinates (e.g. Aerosol® series from Cytec), organosilicones (e.g. Silwet® series from GE Silicons) and fluoro surfactants (e.g. Zonyl® series from DuPont).

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms. Buffers may be used to maintain pH. Buffers include, for example, tris(hydroxymethyl)-aminomethane ("Trizma" or "Tris").

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportions of Ingredients

The components described above can be combined to make an ink in various proportions and combinations in order to achieve desired ink properties, as generally described above, and as generally recognized by those of ordinary skill in the art. Some experimentation may be necessary to optimize inks for a particular end use, but such optimization is generally within the ordinary skill in the art.

The amount of vehicle in an ink is typically in the range of from about 70% to about 99.8%, and more typically from about 80% to about 99%. Colorant is generally present in amounts up to about 10%. Percentages are weight percent of the total weight of ink.

Additives, when present, generally comprise less than about 15% by weight, based on the total weight of the ink. Surfactants, when added, are generally in the range of about 0.1% to about 3% by weight based on the total weight of the ink. Polymers can be added as needed, but will generally be less than about 15% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 mN.m$^{-1}$ to about 50 mN.m$^{-1}$ at 25° C. Viscosity can be as high as 30 mPa·s at 25° C., but is typically in the range of about 1 mPa·s to about 20 mPa·s at 25° C. The ink physical properties are adjusted to the ejecting conditions and printhead design. The inks should have excellent storage stability for long periods so as not clog to a significant extent in an ink jet apparatus. Further, the ink should not corrode parts of the ink jet printing device it comes in contact with, and it should be essentially odorless and non-toxic. Preferred pH for the ink is in the range of from about 6.0 to about 8.

Ink Set

The term "ink set" refers to all the individual inks or other fluids an inkjet printer is equipped to jet. Ink sets typically comprise at least three differently colored inks, for example a cyan, magenta and yellow ink such as CMY ink set of the present invention. More typically, an ink set will include at least four differently colored inks, for example a CMYK ink set, and it is generally advantageous for the ink set of the present invention to further include a black ink. Useful colorants for a black ink include, for example, Direct Black 168, Food Black 2, Reactive Black 31 and carbon black pigment.

In addition to the typical CMYK inks, the ink sets in accordance with the present invention may further comprise one or more "gamut-expanding" inks, including different colored inks such as an orange ink, a green ink, a red ink and/or a blue ink, and combinations of full strength and light strengths inks such as light cyan and light magenta. Such other inks are, in a general sense, known to those of ordinary skill in the art.

Method of Printing

The method of printing prescribed herein can be accomplished with any suitable inkjet printer. The substrate can be any suitable substrate, but the instant invention is particularly useful for printing on paper, especially "plain" paper and specialty paper such as photo glossy paper.

EXAMPLES

Inks were prepared by mixing the indicated ingredients together and filtering the resulting solution. Water was deionized unless otherwise stated. The dyes used were "inkjet grade" meaning that they were relatively pure and free of extraneous salts. Aerosol® OT is a surfactant from Cytec Industries. Byk 348 is a surfactant from Byk Chemie.). Proxel™ GXL is a Biocide from Avecia (Wilmington, Del., USA).

Irgasperse Jet Magenta 3BL was obtained from Ciba Specialty Chemicals (Basel, Switzerland) as both a 20 weight % aqueous solution and as a solid, pure dye. It was used in either form as received.

Color measurements were made with a commercially available spectrophotometer, in this case a Spectroeye from Gretag-MacBeth. Hue ($h_{ab}$) and chroma ($C^*_{ab}$) values are read directly from the instrument but are based on CIELAB colorspace L*, a* and b* terms according to the following equations: $h_{ab} = \tan^{-1}(b^*/a^*)$ where the angle is adjusted for the appropriate quadrant and $C^*_{ab} = (a^{*2} + b^{*2})^{1/2}$. The measurements and definitions are well known in the art, see for example ASTM Standard E308 and *Principles of Color Technology*, Billmeyer and Saltzman, 3rd Ed., Roy Berns editor, John Wiley & Sons, Inc. (2000).

Lighfastness Test

Color patches of 100% and 60% coverage were exposed to fluorescent light under glass for up to 300 hours in a HP UV Light Exposure Test Instrument (Atlas Material Testing Solutions, Phoenix, Ariz.) with the UV lamps turned off. Readings were made at 50, 100, 200 and 300 hours.

The reported lightfastness data, unless otherwise indicated, is the average optical density loss, at the specified exposure time, of the 100% and 60% color patches on each of two different substrates Canon Photo Paper Pro ("Canon photo") and HP Premium Plus Photo Paper ("HP photo"). The Canon paper is a so-called "microporous" paper and the HP is a so-called "polymer coated" paper.

Example 1

Magenta Ink

Magenta Inks M4, M5, M8 and M9 and comparatives M1-M3, M6 and M7 were prepared according to the recipes in the following tables. Unless otherwise stated, ingredient amounts are weight percent of the total weight of ink.

| Ingredients | Ink M1 Comp. | Ink M2 Comp. | Ink M3 Comp. | Ink M4 |
|---|---|---|---|---|
| Reactive Red 180 | 2.85 | — | — | — |
| Acid Red 52 | 0.15 | — | — | 0.5 |
| Irgasperse Jet Magenta 3BL | — | 4.0 | 3.5 | 3.0 |
| Acid Red 289 | — | — | 0.5 | — |
| Glycerol | 9.0 | — | — | — |
| Ethylene glycol | 5.0 | 7.5 | 7.5 | 7.5 |
| Diethylene glycol | 3.0 | 4.5 | 4.5 | 4.5 |
| 2-Pyrrolidone | 0.1 | 7.5 | 7.5 | 7.5 |
| Urea | 7.0 | — | — | — |
| Tris(hydroxymethyl)aminomethane hydrochloride | — | 0.2 | 0.2 | 0.2 |
| Proxel GXL | 0.2 | 0.2 | 0.2 | 0.2 |
| Surfynol 465 | 0.5 | 0.5 | 0.5 | 0.5 |
| Water (balance to 100%) | Bal. | Bal. | Bal. | Bal. |

| Ingredients | Ink M5 |
|---|---|
| Irgasperse Jet Magenta 3BL | 3.0 |
| Acid Red 249 | 1.0 |
| 2-Pyrrolidone | 6 |
| Isopropanol | 2 |
| 1-2 Hexanediol | 2.5 |
| Sodium Nitrate | 3 |
| 1,3-Diamino-2-Propanol | 0.45 |
| Byk 347 | 0.3 |
| Water (balance to 100%) | Bal. |

| Ingredients | Ink M6 Comp. | Ink M7 Comp. | Ink M8 | Ink M9 |
|---|---|---|---|---|
| Irgasperse Jet Magenta 3BL | — | — | 2.25 | 2.0 |
| Acid Red 52 | 3.0 | — | 0.25 | 0.25 |
| Acid Red 249 | — | 3.0 | 0.5 | 0.75 |
| Ethylene glycol | 7.5 | 7.5 | 7.5 | 7.5 |
| Diethylene glycol | 4.5 | 4.5 | 4.5 | 4.5 |
| 2-Pyrrolidone | 7.5 | 7.5 | 7.5 | 7.5 |
| Tris(hydroxymethyl)aminomethane hydrochloride | 0.2 | 0.2 | 0.1 | 0.1 |
| Proxel GXL | 0.2 | 0.2 | 0.1 | 0.1 |
| Surfynol 465 | 0.5 | 0.5 | 0.5 | 0.5 |
| Water (balance to 100%) | Bal. | Bal. | Bal. | Bal. |

The print properties and light-fastness of these inks is summarized in the following tables. Also shown are "HP 57" and "HP 97" magentas which refers to the commercial Hewlett Packard cartridges and inks. The HP 57 magenta appears to be comprised of M377 and AR 52 dyes similar to the magenta inks described in U.S. Pat. No. 6,183,548. The HP inks compare favorably in chroma hue and lightfastness to magentas disclosed in the art and provide a good standard of excellence for comparison.

| Print properties | Ink M1 Comp. | Ink M2 Comp. | Ink M3 Comp. | Ink M4 | Ink M5 |
|---|---|---|---|---|---|
| HP Photo | | | | | |
| Optical Density | — | — | — | 2.34 | 1.95 |
| Chroma | — | — | — | 78 | 70 |
| Hue | — | — | — | 344 | 343 |
| Canon Photo | | | | | |
| Optical Density | 2.08 | 2.08 | 2.16 | 2.03 | — |
| Chroma | 75 | 71 | 73 | 82 | — |
| Hue | 356 | 355 | 353 | 345 | — |
| Light-fastness (% OD loss) | | | | | |
| 100 Hours | 12 | 0 | 3 | 2 | 0 |
| 200 Hours | 25 | 2 | 9 | 3 | — |
| 300 Hours | 30 | 1 | 10 | 4 | — |

| Print properties | Ink M6 Comp. | Ink M7 Comp. | Ink M8 | Ink M9 |
|---|---|---|---|---|
| HP Photo | | | | |
| Optical Density | 2.22 | 2.24 | 2.26 | 2.47 |
| Chroma | 94 | 84 | 81 | 79 |
| Hue | 336 | 7 | 342 | 348 |
| Canon Photo | | | | |
| Optical Density | 1.98 | 1.85 | 1.90 | 1.83 |
| | 97 | 87 | 83 | 84 |
| | 338 | 7 | 345 | 344 |
| Light-fastness (% OD loss) | | | | |
| 100 Hours | 45 | 9 | 0.5 | 0.5 |
| 200 Hours | 67 | 16 | 2 | 3 |
| 300 Hours | 85 | 23 | 2.5 | 3.5 |

| Print properties | HP 57 magenta | HP 97 magenta |
|---|---|---|
| HP Photo | | |
| Optical Density | 1.95 | 2.03 |
| Chroma | 74.4 | 76 |
| Hue | 344 | 345 |
| Light-fastness (% OD loss) | | |
| 100 Hours | 5.9 | 2 |
| 200 Hours | — | 5 |
| 300 Hours | — | 7 |

The hue of the magenta ink is preferably less than about 350 such as, for example, a hue angle in the range of about 340-350. The Irgasperse Jet Magenta 3BL (for brevity "3BL") alone (Ink M2) has a hue angle that is more red than is preferred.

The combination of AR52 with 3BL (ink M4) provides a desirable hue and increased chroma. Surprisingly, there was little or no sacrifice in light-fastness even though Acid Red 52 alone (ink M6) has poor light-fastness.

The combination of AR249 with 3BL (Ink M5) also provides favorable properties, in contrast to the weaker light-fastness of AR249 alone (ink M7). The favorable combination of 3BL with both AR52 and AR249 is demonstrated in inks M8 and M9.

The combination of AR289 with 3BL (Ink M3) failed to reduce the hue angle to a favorable shade and the light-fastness was somewhat less than Control Ink M2 and inventive Ink M4.

As can be seen from the data, the hue, chroma and light-fastness of the inventive magenta inks compared favorably to the commercial "HP 57" and "HP 97" magentas.

Example 2

Ink Sets

Yellow Inks Y8-Y10, comparative inks Y1-Y7 and cyan inks C1 and C2 were prepared according to the recipes in the following tables. Unless otherwise stated, ingredient amounts are weight percent of the total weight of ink.

| Ingredients | Ink Y1 Comp. | Ink Y2 Comp. | Ink Y3 Comp. | Ink Y4 Comp. | Ink Y5 Comp. | Ink Y6 Comp. |
|---|---|---|---|---|---|---|
| Direct Yellow 132 | 3.0 | — | — | — | — | — |
| Acid Yellow 17 | — | 3.0 | — | — | — | — |
| Direct Yellow 173 | — | — | 3.0 | — | — | — |
| Ilford Y-1189 | — | — | — | 3.0 | — | — |
| Ilford Y-104 | — | — | — | — | 3.0 | — |
| Direct Yellow 86 | — | — | — | — | — | 4.0 |
| Ethylene glycol | 7.5 | 7.5 | 7.5 | 7.5 | 7.5 | 7.5 |
| Diethylene glycol | 4.5 | 4.5 | 4.5 | 4.5 | 4.5 | 4.5 |
| 2-pyrrolidone | 7.5 | 7.5 | 7.5 | 7.5 | 7.5 | 7.5 |
| Tris(hydroxymethyl)aminomethane hydrochloride | 0.2 | 0.2 | 0.2 | 0.2 | 0.2 | 0.2 |
| Proxel GXL | 0.2 | 0.2 | 0.2 | 0.2 | 0.2 | 0.2 |
| Surfynol 465 | 0.5 | 0.5 | 0.5 | 0.5 | 0.5 | 0.75 |
| Water (balance to 100%) | Bal. | Bal. | Bal. | Bal. | Bal. | Bal. |

| Ingredients | Ink Y7 Comp. | Ink Y8 | Ink Y9 |
|---|---|---|---|
| Acid Yellow 79 | 3.0 | 4.0 | 2.0 |
| Acid Orange 33 | — | 0.2 | — |
| Direct Yellow 86 | — | — | 2.0 |
| Direct Yellow 169 | — | — | — |
| Ethylene glycol | 7.5 | 7.5 | 7.5 |
| Diethylene glycol | 4.5 | 4.5 | 4.5 |
| 2-pyrrolidone | 7.5 | 7.5 | 7.5 |
| Tris(hydroxymethyl)amino methane hydrochloride | 0.2 | 0.2 | 0.2 |
| Proxel GXL | 0.2 | 0.2 | 0.2 |
| Surfynol 465 | 0.5 | 0.5 | 0.5 |
| Water (balance to 100%) | Bal. | Bal. | Bal. |

| Ingredients | Ink Y10 |
|---|---|
| Acid Yellow 79 | 2.0 |
| Direct Yellow 169 | 1.0 |
| 2-Pyrrolidone | 5 |
| Isopropanol | 2 |
| 1-2 Hexanediol | 2.5 |
| Trimethylolpropane | 4 |
| 1,3-Diamino-2-Propanol | 0.45 |
| Byk 347 | 0.3 |
| Water (balance to 100%) | Bal. |

| Ingredients | Ink C1 |
|---|---|
| Direct Blue 199 | 3.0 |
| Glycerol | 4.5 |
| Ethylene glycol | 6.0 |
| Diethylene glycol | 2.0 |
| 2-pyrrolidone | 5.0 |
| Urea | 7.0 |
| Proxel GXL | 0.2 |
| Surfynol 465 | 0.5 |
| Water (Balance to 100%) | Balance |

The print properties and light-fastness of these inks is summarized in the following tables. Also shown are "HP 97" yellow and cyan which refer to the commercial Hewlett Packard cartridge and inks. Again, the commercial Hewlett Packard inks provide a good standard of excellence for comparison.

| Print properties | Ink Y1 Comp. | Ink Y2 Comp. | Ink Y3 Comp. | Ink Y4 Comp. | Ink Y5 comp. | Ink Y6 Comp. |
|---|---|---|---|---|---|---|
| HP Photo | | | | | | |
| Optical Density | 1.91 | 1.56 | 1.68 | 1.45 | 1.43 | 1.91 |
| Chroma | 89 | 80 | 72 | 73 | 76 | 89 |
| Hue | 93 | 100 | 95 | 94 | 91 | 88 |
| Canon Photo | | | | | | |
| Optical Density | 1.81 | 1.47 | 1.37 | 1.36 | 1.32 | 1.81 |
| Chroma | 91 | 79 | 67 | 72 | 73 | 91 |
| Hue | 95 | 100 | 97 | 96 | 94 | 95 |
| Lightfastness (% OD loss) | | | | | | |
| 100 Hours | 17 | 25 | 20 | 8 | 7 | 12 |
| 200 Hours | 18 | 35 | 21 | 10 | 10 | 14 |
| 300 Hours | 17 | — | — | 8 | 9 | 14 |

| Print properties | Ink Y7 Comp. | Ink Y8 | Ink Y9 | Ink Y10 | HP 97 Yellow |
|---|---|---|---|---|---|
| HP Photo | | | | | |
| Optical Density | 1.59 | 1.74 | 1.83 | 1.7 | 2.31 |
| Chroma | 88 | 92 | 96 | 92.4 | 105 |
| Hue | 98 | 88 | 90 | 89.7 | 86 |
| Canon Photo | | | | | |
| Optical Density | 1.42 | 1.54 | 1.72 | — | 1.64 |
| Chroma | 84 | 88 | 100 | — | 99 |
| Hue | 99 | 90 | 91 | — | 87 |
| Lightfastness (% OD loss) | 7 | 9 | 1 | | 2 |
| 100 Hours | — | — | — | 0 | — |
| 200 Hours | 9 | 9 | 3 | — | 4 |
| 300 Hours | 11 | 15 | 5 | — | 8 |

| Print properties | Ink C1 | HP 97 Cyan |
|---|---|---|
| HP Photo | | |
| Optical Density | — | 1.38 |
| Chroma | — | 63 |
| Hue | — | 223 |

-continued

| Print properties | Ink C1 | HP 97 Cyan |
|---|---|---|
| Canon Photo | | |
| Optical Density | 2.31 | — |
| Chroma | 72 | — |
| Hue | 240 | — |
| Lightfastness (% OD loss) | | |
| 100 Hours | 1 | 4 |
| 200 Hours | 2 | 6 |
| 300 Hours | 5 | 7 |

The following example ink sets A-F represent ink sets of the present invention. The hue and light-fastness of each is summarized and shown against the commercial HP 97 ink set.

| Ink Set Examples | Yellow Ink, colorant | Magenta Ink, colorant | Cyan Ink, colorant |
|---|---|---|---|
| | Ink Y9 | Ink M4 | Ink C1 |
| Ex. A | 2% AY79 + 2% DY86 | 3% 3BL + 0.5% AR52 | 3% DB199 |
| | Ink Y9 | Ink M5 | Ink C1 |
| Ex. B | 2% AY79 + 2% DY86 | 3% 3BL + 1% AR249 | 3% DB199 |
| | Ink Y8 | Ink M4 | Ink C1 |
| Ex. C | 4% AY79 + 0.2% AO33 | 3% 3BL + 0.5% AR52 | 3% DB199 |
| | Ink Y8 | Ink M5 | Ink C1 |
| Ex. D | 4% AY79 + 0.2% AO33 | 3% 3BL + 1% AR249 | 3% DB199 |
| | Ink Y10 | Ink M4 | Ink C1 |
| Ex. E | 2% DY79 + 1% DY169 | 3% 3BL + 0.5% AR52 | 3% DB199 |
| | Ink Y10 | Ink M5 | Ink C1 |
| Ex. F | 2% DY79 + 1% DY169 | 3% 3BL + 1% AR249 | 3% DB199 |

| | HP 97 | Ex. A | Ex. B | Ex. C | Ex. D | Ex. E | Ex. F |
|---|---|---|---|---|---|---|---|
| Light-Fastness | | | | | | | |
| Yellow | 8 | 5 | 5 | 15 | 15 | 0* | 0* |
| Magenta | 7 | 4 | 0* | 4 | 0* | 0* | 0* |
| Cyan | 7 | 5 | 5 | 5 | 5 | 5 | 5 |
| Hue | | | | | | | |
| Yellow | 86 | 90 | 90 | 88 | 88 | 92.4 | 92.4 |
| Magenta | 345 | 344 | 343.5 | 344 | 343.5 | 344 | 343.5 |
| Cyan | 223 | 240 | 240 | 240 | 240 | 240 | 240 |

*100 hour exposure data

In selecting an ink set, the inks should have not only good chroma and appropriate hue, but also, preferably, favorable and relatively comparable light-fastness so that when prints ultimately fade they do so uniformly across the gamut. As can be seen from the results summarized in the following table, the inventive ink sets compare favorably to ink sets known in the art, such as the commercial HP 97 ink set.

What is claimed is:

1. An inkjet ink set comprising:
   (a) a magenta inkjet ink comprising a first magenta dye and a second magenta dye wherein the first magenta dye comprises at least one compound of formula 1, as follows, and/or any salt form thereof:

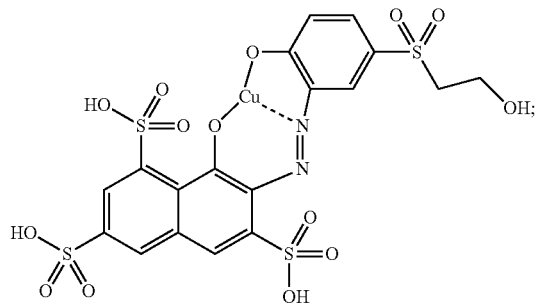

(Formula 1)

and the second magenta dye consisting of Acid Red 249 (AR249);
   (b) a yellow inkjet ink comprising Acid Yellow 79 (AY79) dye and a second dye consisting of Direct Yellow 169 (DY169); and,
   (c) a cyan inkjet ink comprising Direct Blue 199 dye.

2. The ink set of claim 1 wherein the yellow ink further comprises Acid Orange 33 (AO33).

3. The ink of claim 2, wherein the weight ratio of AY79 to AO33 is in the range of 50:1 to 2:1.

4. The ink set of claim 1 wherein the yellow ink further comprises Direct Yellow 86 (DY86).

5. The ink of claim 4, wherein the weight ratio of AY79 to DY86 is in the range of 9:1 to 1:9.

6. The ink of claim 1, wherein the weight ratio of AY79 to DY169 is in the range of 5:1 to 1:5.

7. An ink set according to claim 1, wherein the magenta, yellow and cyan inks are aqueous inkjet inks, each comprising an independently selected aqueous vehicle.

8. The ink set of claim 1, wherein the magenta ink further comprises Acid Red 52 (AR52).

9. The ink set of claim 8, wherein the yellow ink further comprises AO33.

10. The ink set of claim 8, wherein the yellow ink farther comprises DY86.

11. A method for ink jet printing onto a substrate, comprising the steps of:
   (a) providing an ink jet printer that is responsive to digital data signals;
   (b) loading the printer with a substrate to be printed;
   (a) loading the printer with an inkjet ink set; and
   (b) printing onto the substrate using the inkjet ink inkjet ink set in response to the digital data signals,
   wherein the ink set comprises a magenta inkjet ink comprising a first magenta dye and a second magenta dye wherein the first magenta dye comprises at least one compound of Formula 1, as follows, and/or any salt form thereof:

(Formula 1)
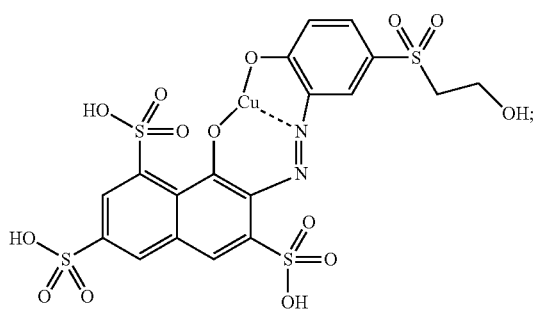
and the second magenta dye consisting of Acid Red 249 (AR249); a yellow inkjet ink comprising Acid Yellow 79 (AY79) dye and a second dye consisting of Direct Yellow 169 (DY 169); and, a cyan inkjet ink comprising Direct Blue 199 dye.
12. The method of claim 11, wherein the substrate is plain paper or photo glossy paper.
* * * * *